United States Patent [19]

Hardy

[11] Patent Number: 4,835,963
[45] Date of Patent: Jun. 6, 1989

[54] DIESEL ENGINE PARTICULATE TRAP REGENERATION SYSTEM

[75] Inventor: James A. Hardy, Playa Del Rey, Calif.

[73] Assignee: Allied-Signal Inc., Morristown, N.J.

[21] Appl. No.: 901,483

[22] Filed: Aug. 28, 1986

[51] Int. Cl.$^4$ .................. F01N 3/02; F02B 37/00; F02D 9/06
[52] U.S. Cl. ...................... 60/274; 60/280; 60/286; 60/602; 123/323
[58] Field of Search ............ 60/274, 286, 280, 602; 123/323

[56] References Cited

U.S. PATENT DOCUMENTS

| | | |
|---|---|---|
| 2,488,563 | 11/1949 | Sills . |
| 3,019,778 | 2/1962 | Kloss .................... 123/323 |
| 3,131,533 | 5/1964 | Vandenberg . |
| 3,234,924 | 2/1966 | May . |
| 3,430,436 | 3/1969 | Bader ..................... 60/602 |
| 3,523,418 | 8/1970 | Marsee . |
| 3,524,316 | 8/1970 | McKee . |
| 3,788,284 | 1/1974 | Gardner . |
| 3,805,521 | 4/1974 | Dafler et al. . |
| 3,820,328 | 6/1974 | Garcea . |
| 3,870,083 | 3/1975 | Nezat . |
| 3,911,675 | 10/1975 | Mondt . |
| 3,938,330 | 2/1976 | Nakajima et al. . |
| 3,940,928 | 3/1976 | Pozniak ................... 60/290 |
| 3,961,478 | 6/1976 | Lange . |
| 4,051,821 | 10/1977 | Amann . |
| 4,211,075 | 7/1980 | Ludecke et al. . |
| 4,254,752 | 3/1981 | Friddell et al. . |
| 4,281,512 | 8/1981 | Mills . |
| 4,381,643 | 5/1983 | Stark . |
| 4,404,795 | 9/1983 | Oishi et al. . |
| 4,404,796 | 9/1983 | Wade . |
| 4,449,362 | 5/1984 | Franenberg et al. . |
| 4,520,624 | 6/1985 | Kiyota et al. . |
| 4,522,028 | 6/1985 | Hasegawa et al. . |
| 4,541,239 | 9/1985 | Tokura . |
| 4,549,398 | 10/1985 | Oishi et al. . |
| 4,549,399 | 10/1985 | Usui et al. . |
| 4,553,387 | 11/1985 | Mayer . |
| 4,557,108 | 12/1985 | Torimoto . |
| 4,565,065 | 1/1986 | Kimura et al. . |

FOREIGN PATENT DOCUMENTS 65924 4/1983 Japan ....................... 60/286

Primary Examiner—Douglas Hart
Attorney, Agent, or Firm—Ken C. Decker

[57] ABSTRACT

A diesel engine exhaust particulate trap and regeneration system for trapping of particulates in the engine gases and periodic burning thereof is disclosed. Collected particulates are burned in the trap by increasing the trap temperature utilizing a backpressure valve in the exhaust gas line. A microprocessor, which receives engine operating parameters via sensors, compares the sensed parameter valves to engine maps stored in its memory and opens or closes the valve via an actuator in response thereto.

19 Claims, 10 Drawing Sheets

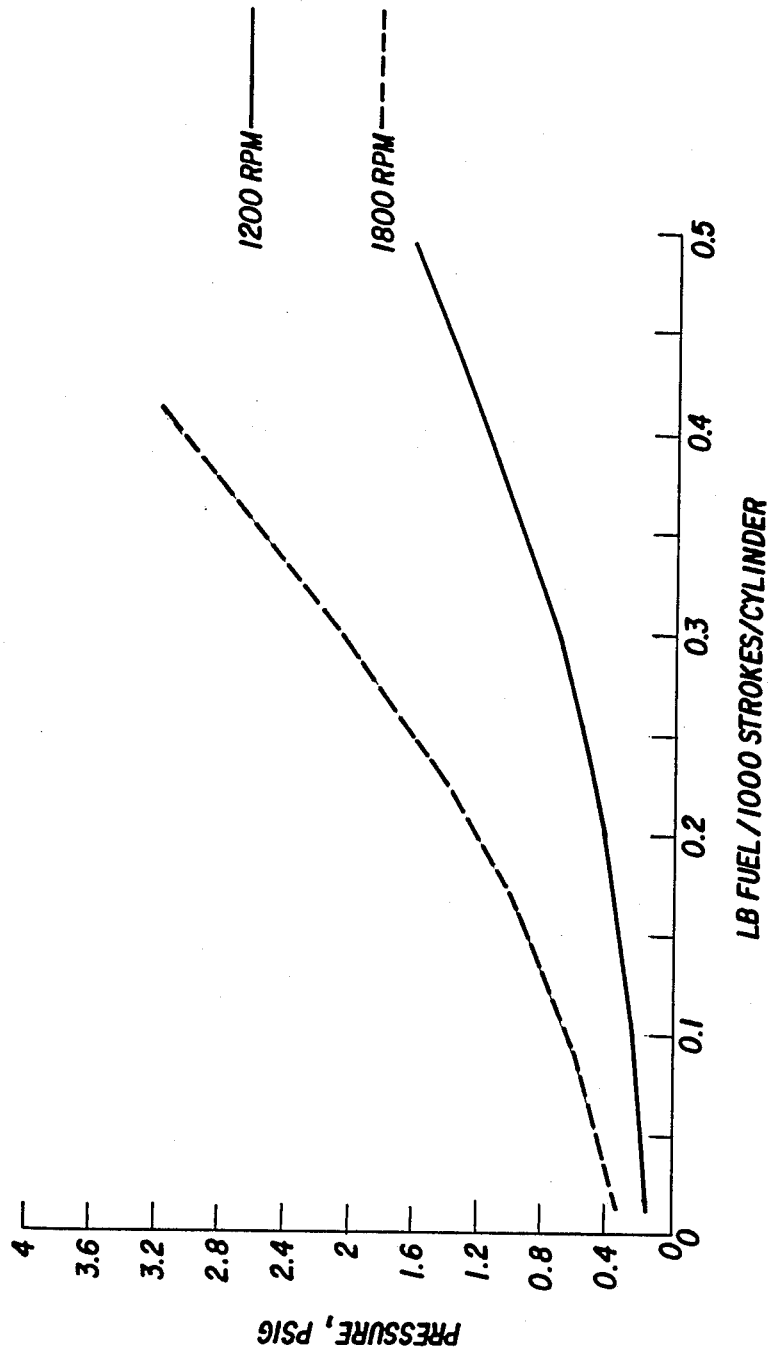

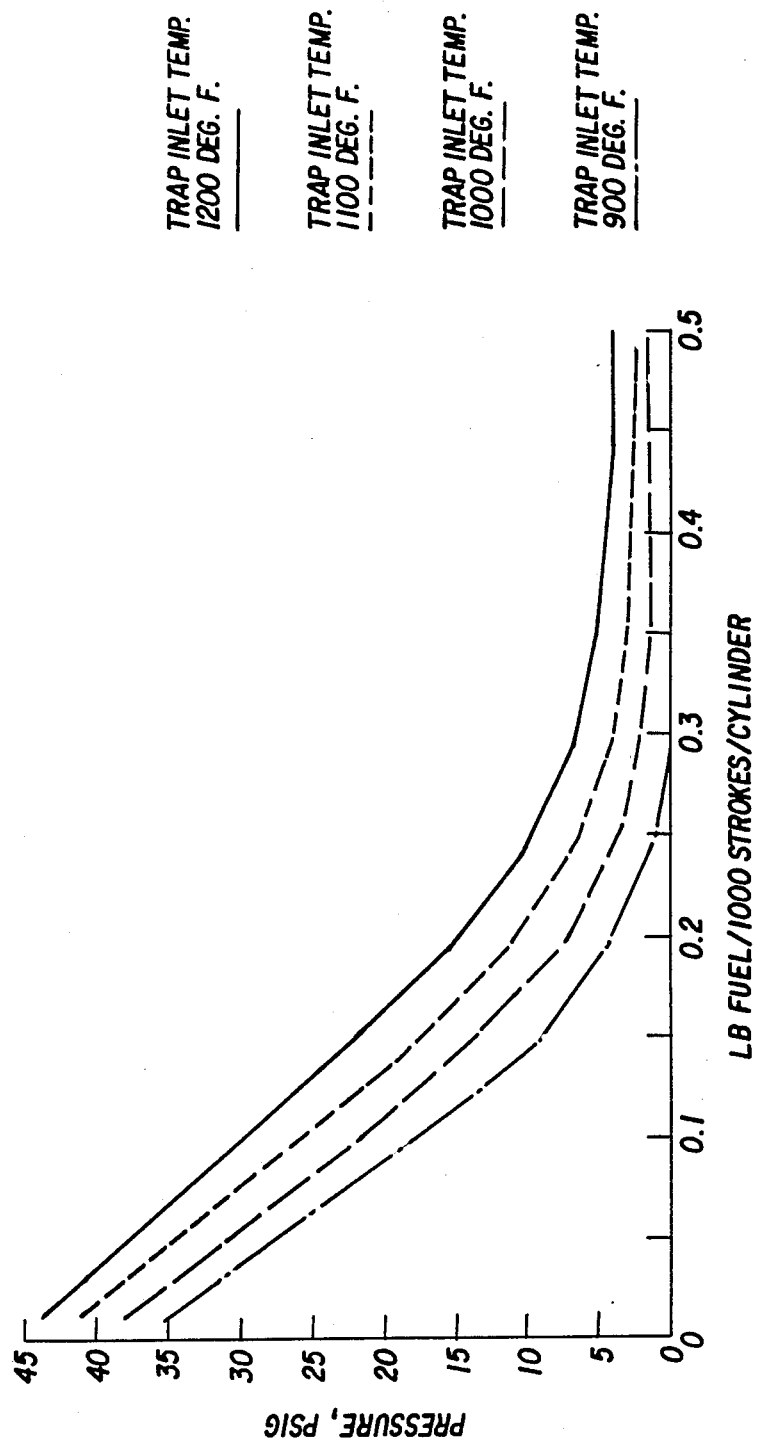
FIG. 5 BACKPRESSURE REQUIRED FOR REGENERATION AT 1200 RPM

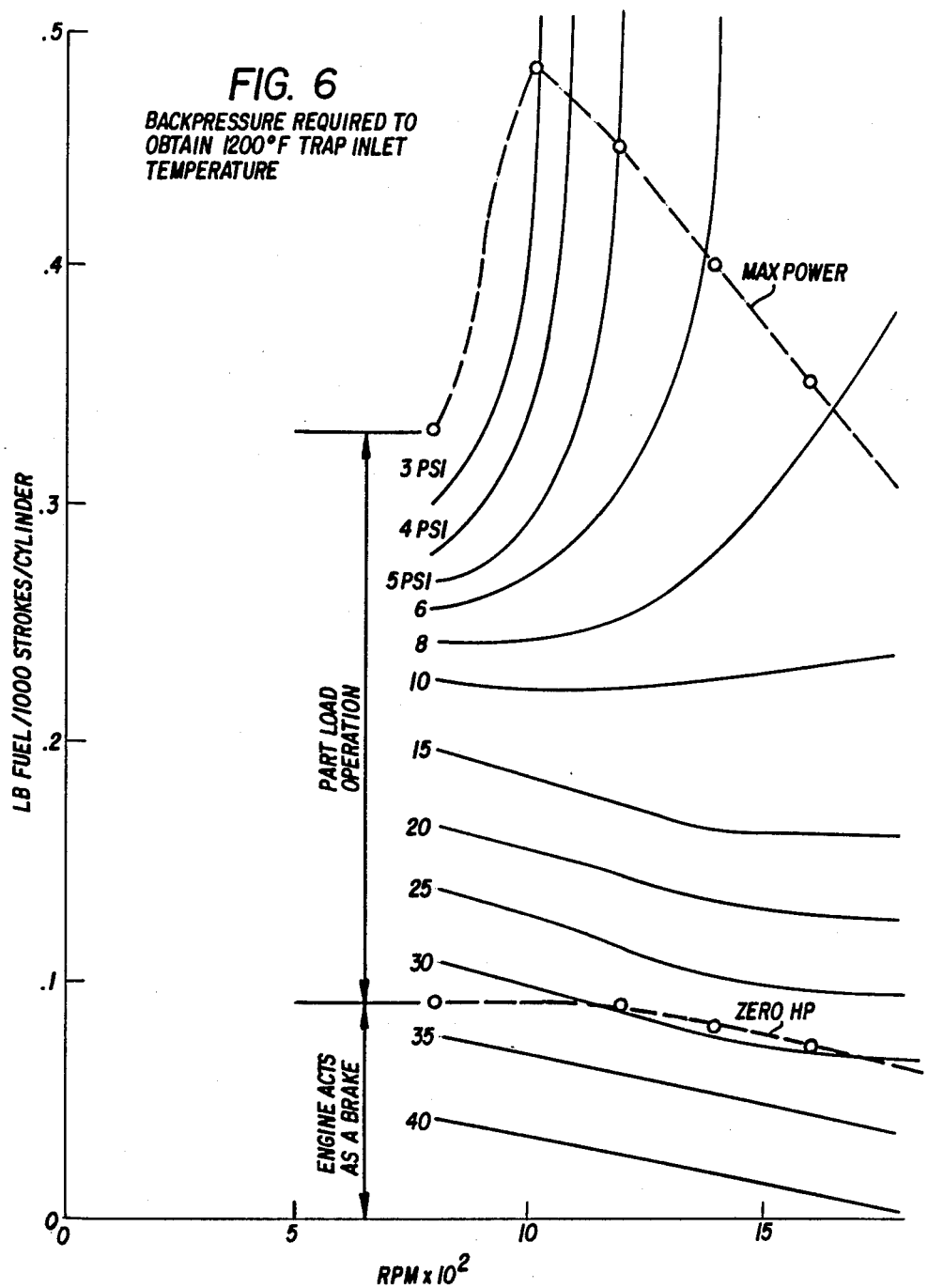

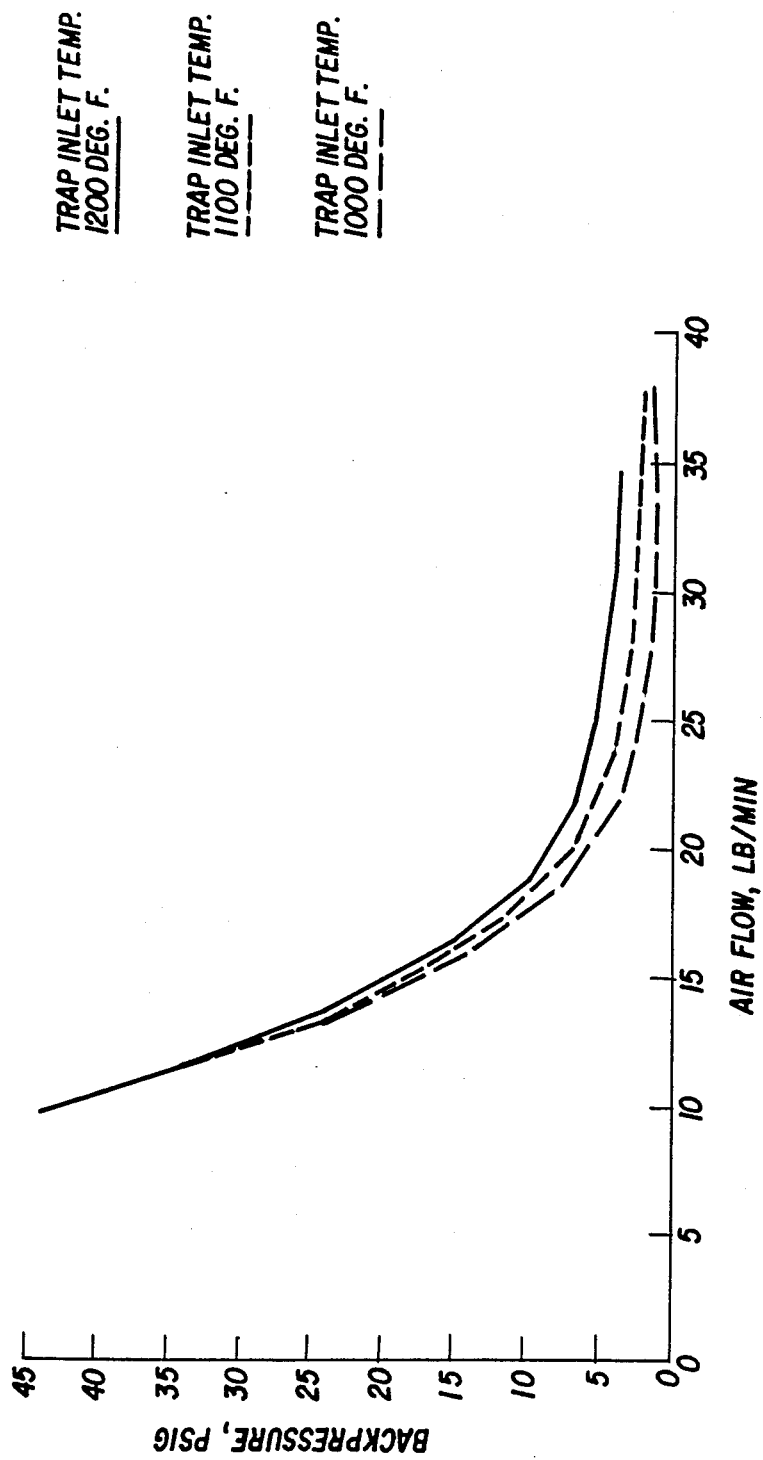
FIG. 7 BACKPRESSURE VS. AIR FLOW DURING REGENERATION AT 1200 RPM

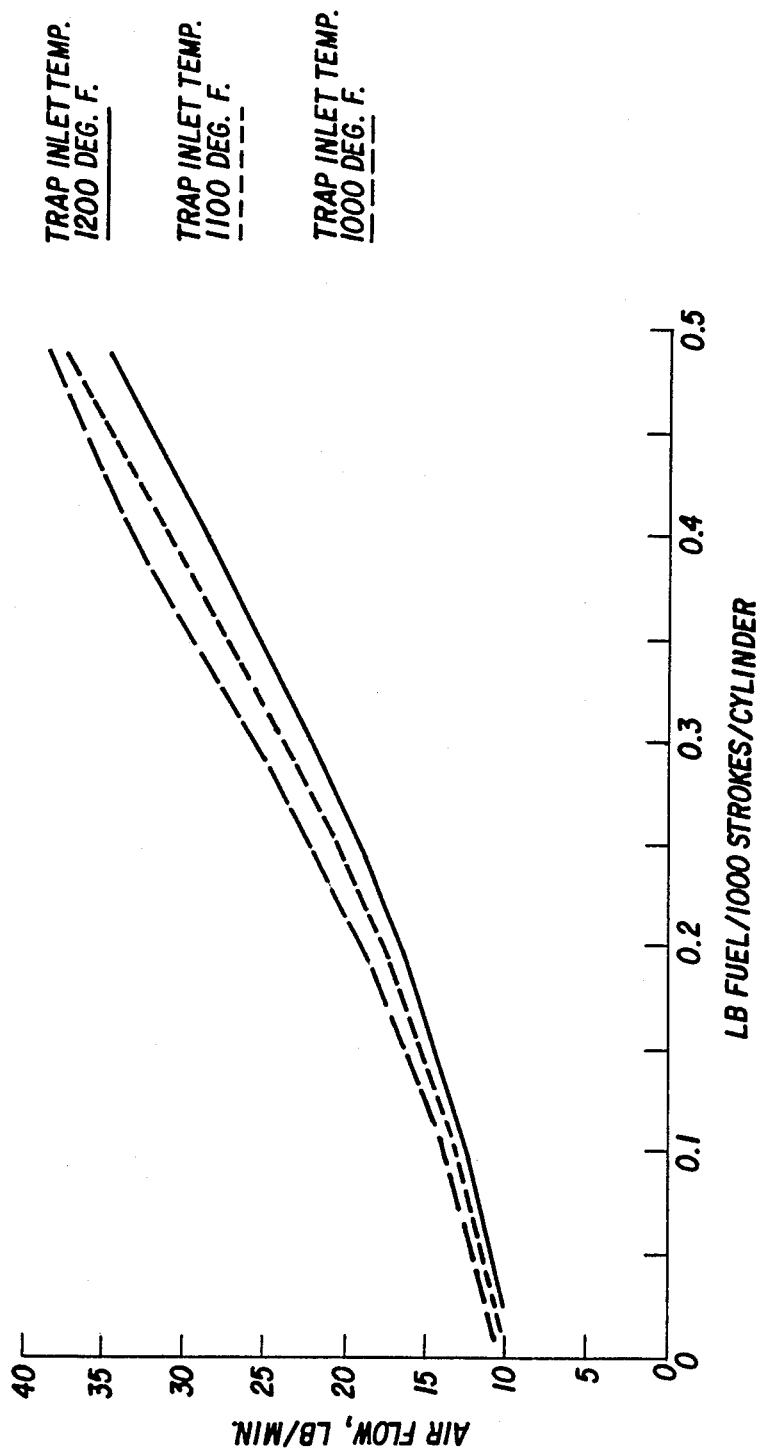
FIG. 8 AIR FLOW VS. FUEL FLOW DURING REGENERATION AT 1200 RPM

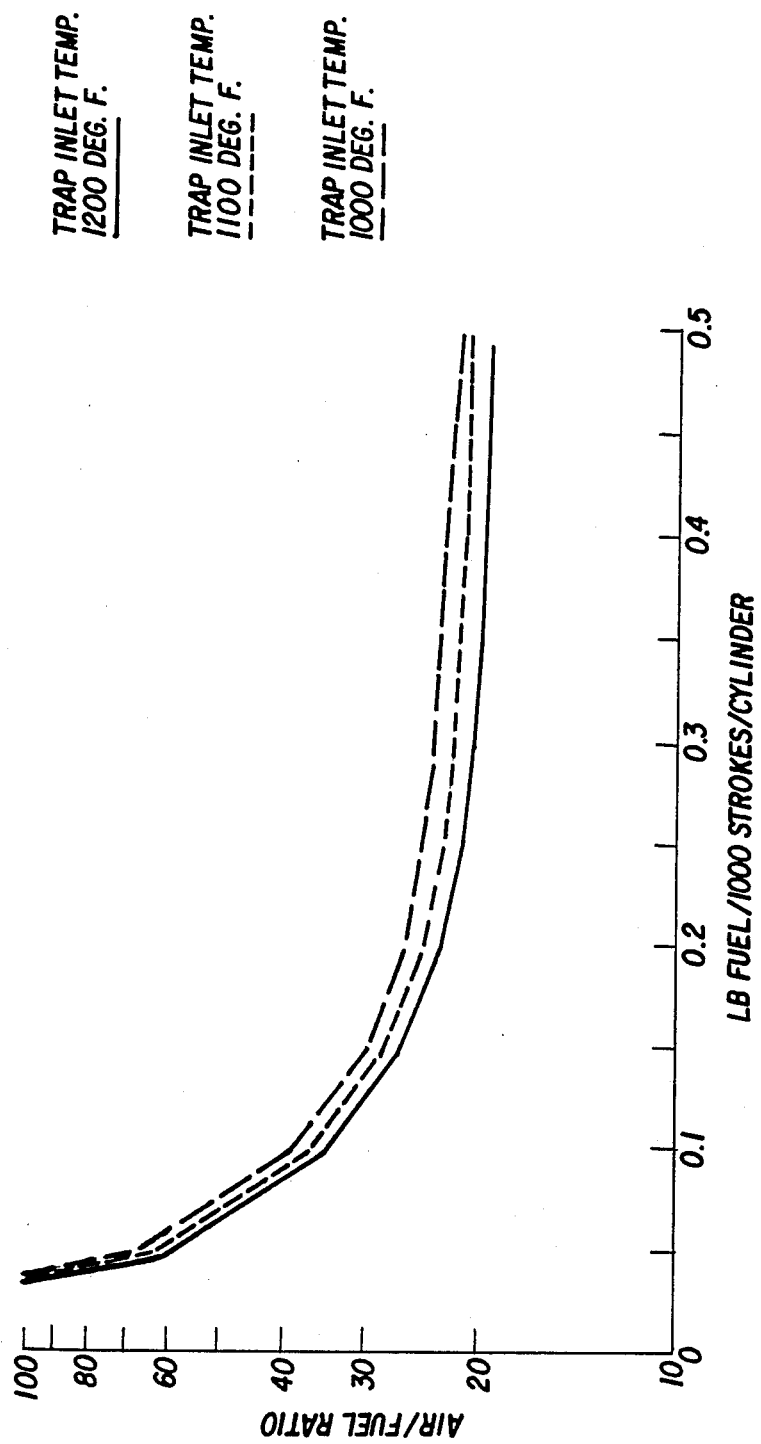
FIG. 9 AIR/FUEL RATIO DURING REGENERATION AT 1200 RPM

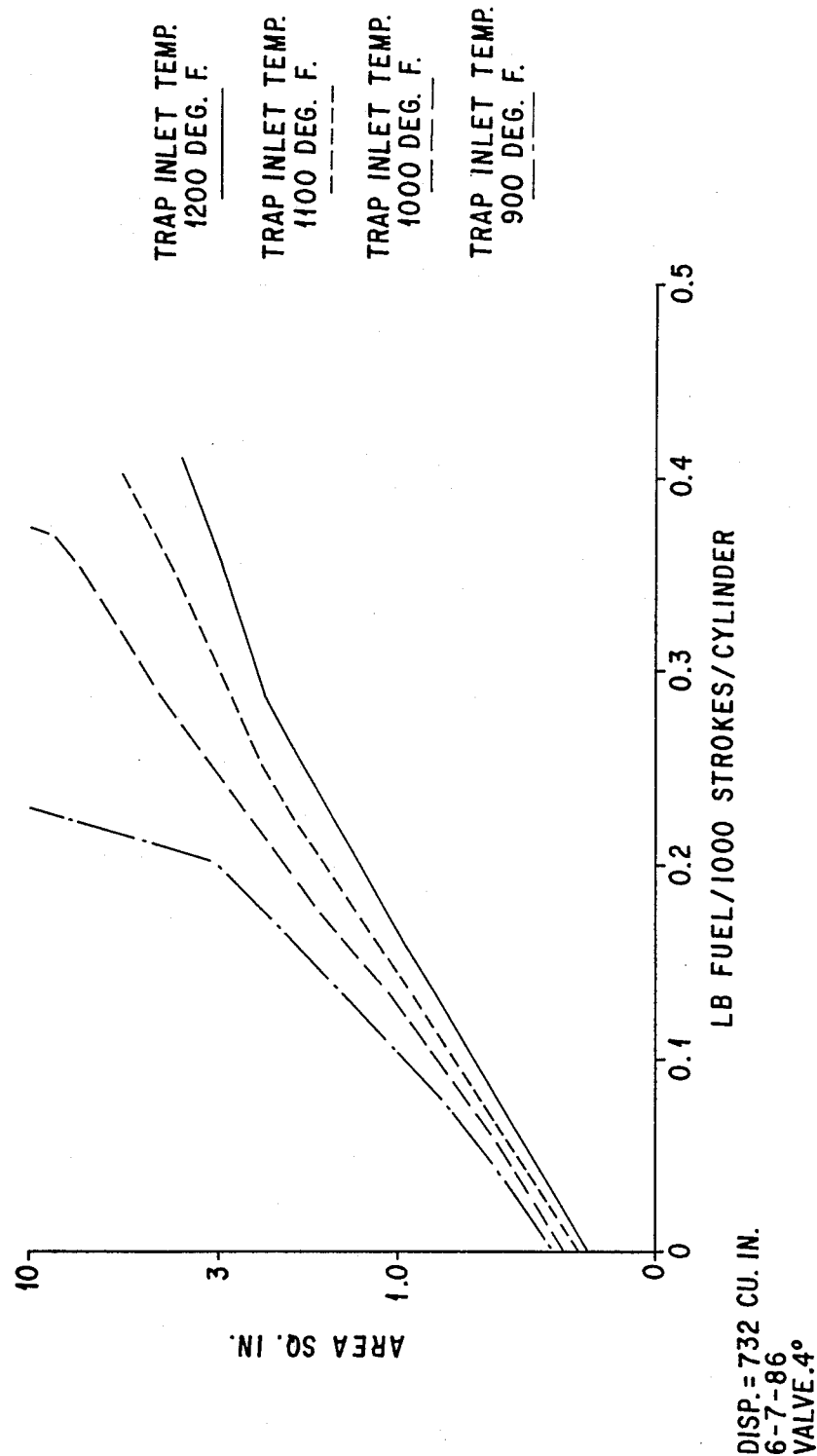

DIESEL ENGINE PARTICULATE TRAP REGENERATION SYSTEM

BACKGROUND AND SUMMARY OF THE INVENTION

This invention relates to emission controls for vehicles powered by internal combustion engines and in particular to the filtering of particulates from engine exhaust gases and more specifically, to the periodic incineration of the collected particulates in the filter through a temporary increase in the exhaust gas temperature by backpressuring of the engine.

Federal and State governments have adopted stringent new standards for particulate emissions for all diesel powered road vehicles. These new standards necessitate a device in the diesel engine exhaust system for removal of the particulates. Such exhaust treatment systems typically consist of a particulate trap to collect particulates from the exhaust gas stream during engine operation. Such particulates consist largely of carbon and heavy hydrocarbon particles which, with continued operation, tend to plug the exhaust filter, causing a restriction to the normal exhaust gas flow. Periodic cleaning of the particles from the exhaust gas filter is required in order to avoid the increase in the engine exhaust backpressure which adversely affects the fuel economy and vehicle performance.

In order to burn the filtered particulate it is necessary to increase the exhaust gas temperature in the filter or trap. Under typical operation, diesel engine exhaust temperatures high enough to burn the particulate are not experienced for sufficient time periods to clean the trap. Therefore, either a separate device is required to provide sufficient heat to burn the accumulated particulates or a separate means of obtaining increased exhaust gas temperatures must be found.

One means for increasing the exhaust gas temperature is to use a burner upstream of the filter. This may be accomplished by any practical burner mechanism such as the mechanism disclosed in the copending U.S. patent application Ser. No. 794,346, filed on Nov. 1, 1985 and entitled "Diesel Engine Particulate Trap Regeneration System". However, burners have several disadvantages, which include the use of additional fuel, the pumping transport and injection of that fuel and the general problems of stable combustion at low pressures.

The present invention has been developed to eliminate the need for a burner device to be used in cooperation with the particulate filter. According to the apparatus of the present invention, a particulate trap regeneration system used in association with a turbocharged or naturally aspirated engine comprises an exhaust gas particulate trap within the engine exhaust system downstream of the engine, a backpressuring valve within the engine exhaust gas flow downstream of said engine, an actuator to control the movement of the backpressure valve and a microprocessor for receiving relevant engine operating parameters from sensors and controlling the actuator. Under normal operating procedure, the backpressure valve remains in a wide open position. However, when the particulate trap pressure drop reaches a value indicating a significant amount of particles are present, as sensed by the microprocessor, the backpressure valve is partially closed. At this time the microprocessor activates the actuator to close the valve, thus increasing the particulate trap temperature; which in turn allows oxidation of the trapped debris.

It is an object of the present invention to provide a diesel engine particulate trap and regeneration system in order to reduce pollution.

It is another object of this invention to provide an improved system for controlling the regeneration cycle of the particulate trap. The resulting system will cause a minimum performance and efficiency loss to the engine and will be mechanized in a simple and reliable manner.

It is a further object of this invention to provide a regeneration system which is capable of raising the exhaust gas temperature to levels sufficient to cause incineration of the trapped particulate without the use of an auxiliary burner.

BRIEF DESCRIPTION OF THE DRAWINGS

FIG. 4 is a engine map of the loaded trap pressure vs. rack position at two engine speeds.

FIG. 5 is an engine map of engine back pressure vs. fuel input (rack position) for one engine speed and intake temperature.

FIG. 6 is an engine map of lines of constant backpressure required to obtain a 1200° F. trap inlet temperature plotted with fuel input and engine speed as coordinates.

FIG. 7 is an engine map of engine back pressure vs. engine air flow.

FIG. 8 is an engine map of air flow vs. fuel input.

FIG. 9 is an engine map of air/fuel ratio vs. fuel input.

FIG. 10 is an engine map of valve area vs. fuel input.

DETAILED DESCRIPTION OF THE INVENTION

Figure 1:
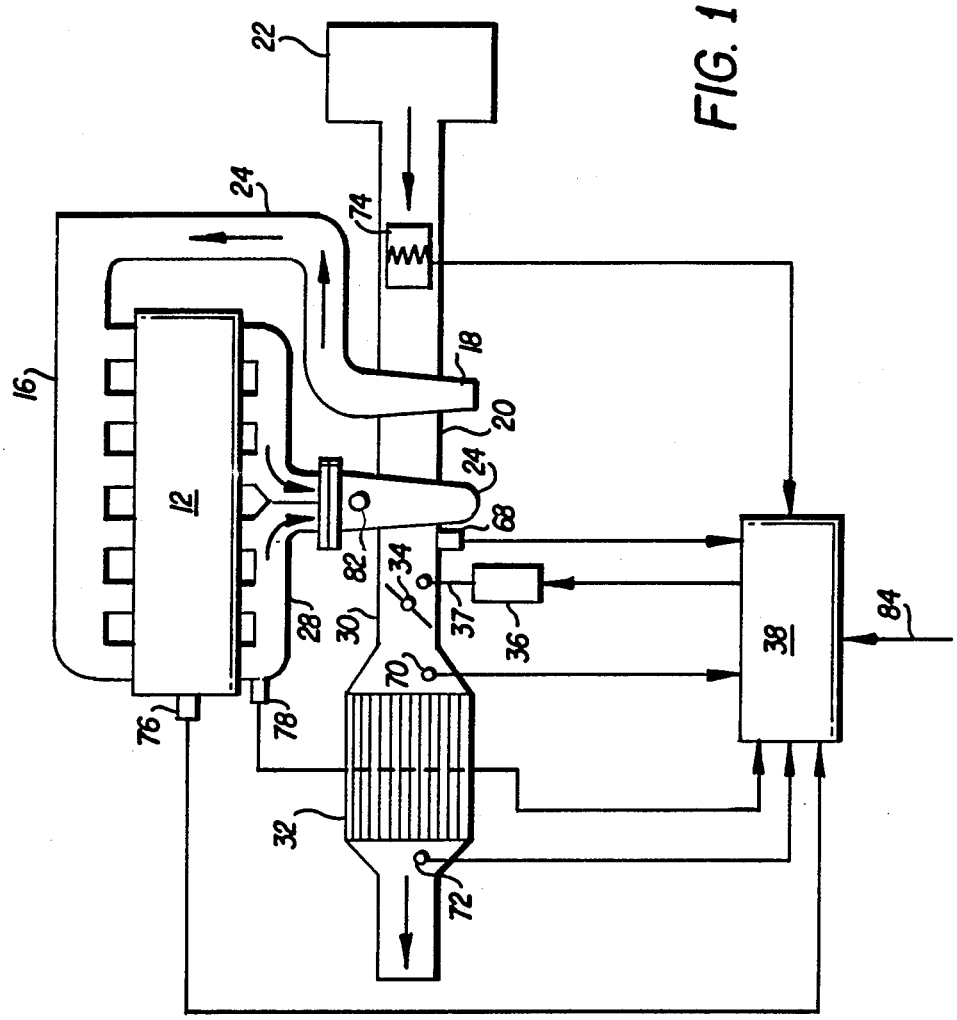
FIG. 1 is a schematic view of a turbocharged diesel engine and the exhaust gas particulate trap regeneration system of the present invention.
Figure 2:
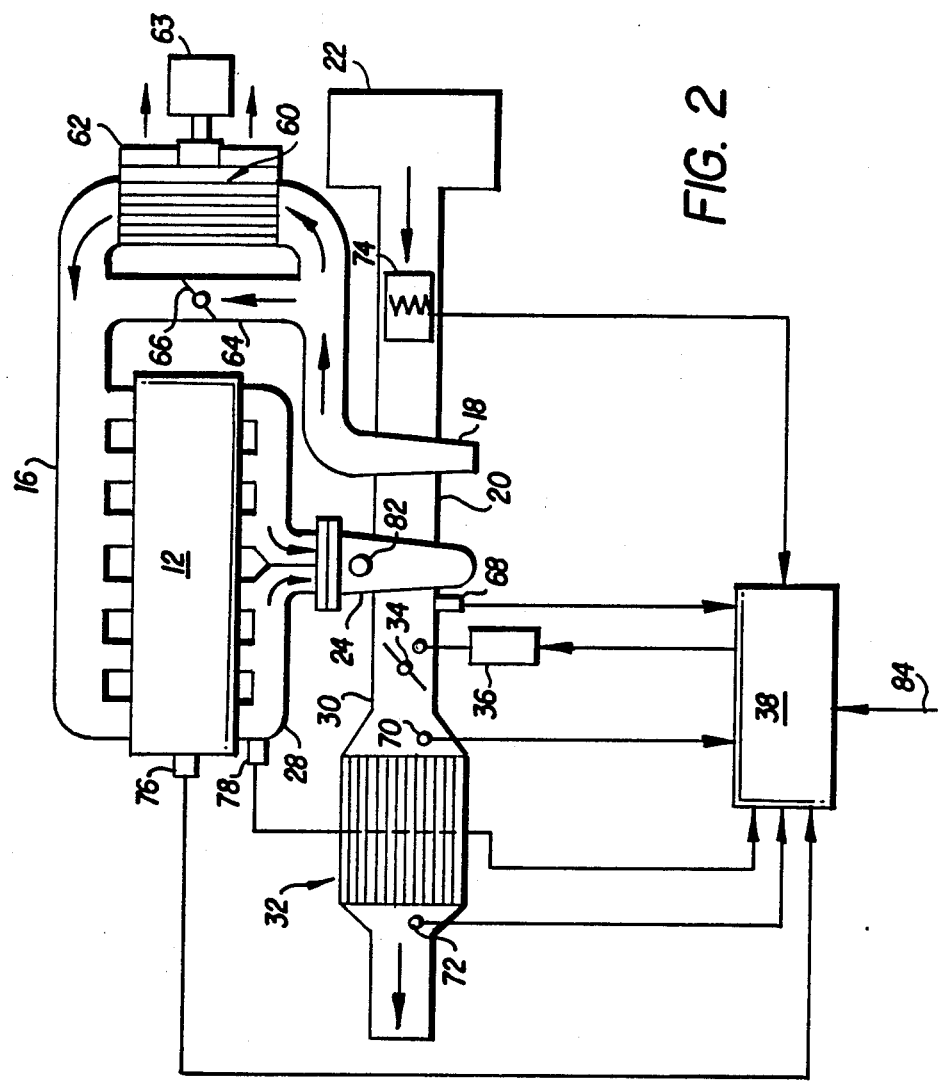
FIG. 2 is a schematic view of the engine and exhaust gas particulate trap regeneration system of FIG. 1 including a charge air cooler in the system.

An engine particulate trap system is shown in FIGS. 1 and 2 and generally comprises a combustion engine 12, such as a diesel powered internal combustion engine having a plurality of combustion cylinders, for rotatably driving an engine crank shaft. While shown to be used with a turbocharger 20, the particulate trap system of the present invention can be used with a naturally aspirated engine. The engine includes an air intake manifold 16 through which air is supplied by means of a compressor 18 of the turbocharger 20. In operation the turbocharger compressor 18 draws in ambient air through an air filter 22 and compresses the air with a rotatable compressor impeller to form so-called charge air for supply to the engine 12 via the inlet manifold 16 for combustion purposes.

Exhaust products are discharged from the engine 12 through an exhaust manifold 28 for supply to a turbine 24 of the turbocharger 20. The high temperature exhaust gas rotatably drives a turbine wheel (not shown) within the turbine housing at a relatively high rotational speed (up to 190,000 RPM) to correspondingly drive the compressor impeller within the compressor housing 18. In this regard, the turbine wheel and compressor impeller are carried for simultaneous rotation on a common shaft supported within the turbocharger center housing. After driving communication with the turbine wheel, the exhaust gases are discharged from the turbocharger 20 to an exhaust gas outlet 30 which includes the exhaust gas particulate trap 32 and noise abatement equipment. Located within the exhaust gas outlet 30 is a backpressure valve 34.

As shown in FIG. 1, the particulate trap regeneration system comprises the exhaust gas particulate trap 32, the backpressure valve 34 preferably located upstream of the particulate trap, an actuator 36 for electronically controlling the movement of the backpressure valve, and a microprocessor 38 for receiving relevant engine operating parameters and controlling movement of valve 34 via the actuator 36. Alternatively, the backpressure valve can be located upstream of the turbocharger 20 or downstream of the trap 32.

The exhaust gas particulate trap can be made of any suitable material or configuration capable of trapping and holding substantial quantities of particulates from the engine exhaust gas stream without creating an excessive restriction to the exhaust gas flow. It must also be able to withstand the elevated temperature required during incineration of the trapped particles. When used with a turbocharged engine, the particulate trap 32 should be located as close downstream of the turbocharger 20 as possible in order that the exhaust gas retain its high temperature. The trap 32 should have as low a pressure drop as possible in order to minimize the effect on engine performance.

Figure 3B:
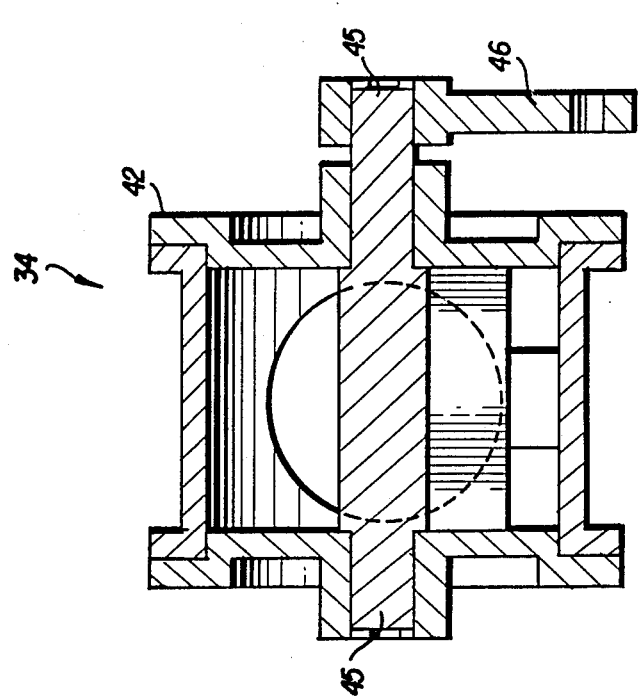
FIGS. 3a and 3b are end and side cross-sectional views of the backpressure valve of the present invention.
Figure 3A:
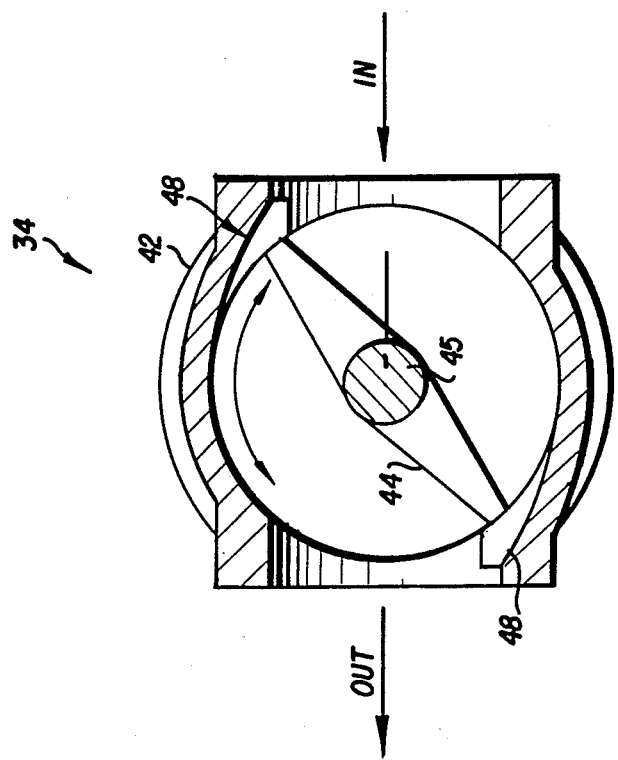

Backpressure valve 34 can be any type of valve which provides control over the flow area; for example a butterfly valve. However, it has been found that it is important to provide accurate flow rates near shut off condition, therefore, a valve as shown in FIG. 3 is preferred. The valve 34 includes a casing 42 which converts the circular flow area of the inlet conduit into a generally rectangularly shaped cross-sectional flow area within the valve, see FIG. 3b. A valve head 44 having pivot pins 45 at each side is mounted within the casing 42. Pins 45 extend into bores in the casing 42 to pivotably support the valve head 44. One of the pins is connected to a suitable valve arm 46 which is connected to and pivoted by actuator 36. One edge 48 at the inlet and outlet of the valve is tapered in order to provide venier control near the shut-off point of the valve.

In addition to reducing exhaust emissions, the backpressure valve offers an additional important benefit; braking. As shown in FIG. 6, the combination of closing the back-pressure valve to increase back pressure and reduction of fuel flow makes the diesel engine an energy absorber rather than a energy producer. It is visualized that the backpressure valve will communicate with the vehicle control system to provide braking at various times. Of particular significance is use of the valve to brake on long steep grades without use of the vehicle friction brakes. Use of the back pressure valve for braking has three advantages: (1) Safety—it is a back up to the vehicle friction brake system; (2) Economy—it extends the life of the vehicle friction brake system; and (3) Utility—use of the back pressure valve for braking will automatically provide a degree of particulate trap regeneration.

Actuator 36 (FIGS. 1 and 2) can be of any suitable type; mechanical, electrical, pneumatic or any combination thereof. Actuators 36 receives a signal from the microprocessor 38 and converts it into the appropriate movement of valve arm 46 (FIG. 3) for proper positioning of the valve head 44.

As shown in FIG. 2, a charge air cooler 60 can be used in association with the turbocharged engine system of FIG. 1. When used, the charge air cooler 60 is located downstream of the compressior 18 and operates to reduce the temperature of the charge air in order to increase the density of the charge air supplied to the engine 12. A fan 62, run by a motor 63, can be located adjacent to the charge air cooler 60 for purposes of supplying cooling air through the charge air cooler. Located in parallel relationship to the charge air cooler is a charge air bypass conduit 64 having a charge air bypass valve 66 therein for controlling the amount of air flow to the charge air cooler 60.

Shown in FIGS. 1 and 2 are the controls which function to determine when the trap needs regeneration and then to maintain a nearly constant, high exhaust temperature over a wide range of engine speeds and loads during the time the trap is being regenerated. As shown, microprocessor 38 receives inputs from a selected number of inputs depending on the desired engine parameters used: a pressure sensor 68 located upstream of the backpressure valve 34, temperature sensors 70 and 72 located immediately upstream and downstream of trap 32, an air flow measurement device 74 located between the air filter 22 and the compressor 18, engine speed sensor 76, rack position or fuel flow sensor 78, oxygen sensor 82 in the exhaust manifold and signal 84 from a driver activated override lever. It it to be understood that a rack position sensor and a fuel flow sensor are interchangeable, however, a fuel flow sensor will provide a more desireable measurement.

The most likely method of determining when the trap needs regeneration is to sense pressure drop across the trap. When this pressure drop exceeds a value that represents a loaded trap pressure trop (see FIG. 4), the control will initiate the regeneration mode. The regeneration mode will then be continued until the particulates in the trap 32 are essentially all oxidized. Alternatively, continuing the regeneration mode for a certain time interval is an adequate and simple means for accomplishing this.

The pressure drop through the loaded trap will vary with engine load and speed. A map of the loaded trap pressure drop versus rack position or fuel flow and rpm will need to be developed for each engine and exhaust system. FIG. 4 is a typical map for a typical engine.

Each map can best be developed by running tests but can also be approximated by analytical means. The map will then be programmed into the memory of the microprocessor 38. Whenever the pressure drop exceeds the value on the stored map for a given load and speed, the regeneration mode will be triggered. In addition, the driver activated lever mounted near the vehicle steering wheel can send a signal 84 which can be used to close the valve 34 when braking is desired.

During the regeneration mode the control should modulate the back pressure valve 34 so that an essentially constant trap inlet temperature is maintained. This temperature should be approximately 1100° F. to 1200° F. for uncatalyzed traps and 750° F. to 850° F. for catalyzed traps. The most direct means for controlling exhaust temperature is to sense the exhaust temperature at 70; and to close the back pressure valve 34 incrimentally whenever the exhaust temperature is lower than the desired temperature and to open the valve whenever the temperature exceeds the desired temperature. Use of temperature as the controlling parameter requires careful dynamic matching of all system components to prevent valve overtravel and the attendent overshooting of the exhuast gas temperature which could damage the particlate trap and adversely effect engine emission and performance.

Care must also be taken to prevent exhaust gas over temperature during regeneration and following a sudden increase in fuel flow. The back pressure valve must open quickly when the engine fuel input is suddenly increased. The back pressure valve must open very quickly because the fuel input can increase from nearly zero input to maximum input within two revolutions of the engine. This quick response requires some means of anticipating the change in fuel input and/or a means of slowing the rate of increase in fuel. Hence, a rack position sensor 78 may be incorporated into the control system.

There are other less direct means for controlling exhaust temperature. For example, an engine map can be developed that will show what back pressure is needed to obtain the desired exhaust temperature for each combination of rack position or fuel flow, engine rpm and intake temperature. Using these parameters to control the back pressure and exhaust temperature is less direct than controlling temperature, but it would suffer less from response and overshoot problems. FIG. 5 is a typical map of backpressure vs fuel input (rack position) for one speed and intake temperature. FIG. 6 is an engine map of the backpressure required to obtain 1200° F. trap inlet temperature plotted as a function of fuel input and engine speed. Hence, for any given fuel flow and engine speed the microprocessor can signal the actuator to open or close the backpressure valve in order to obtain the desired backpressure.

A map of exhaust pressure required to obtain a desired exhaust temperature for each combination of engine air flow, rack position or fuel flow and intake temperature can be developed as shown in FIGS. 7 and 8.

Where the air/fuel ratio can be sensed accurately with an oxygen sensor 82 over a range from 18:1 to 80:1, this parameter could also be used along with engine speed and trap inlet temperature to signal the control system what back pressure is required to obtain a desired exhaust temperature. FIG. 8 shows a plot of air/fuel ratio vs air flow required to achieve various trap inlet temperatures.

The back pressure valve position might be used instead of back pressure to maintain the desired trap regeneration temperature providing the valve flow area can be accurately related to position for areas of 10.0 sq. in. down to approximately 0.2 sq. in. FIG. 10 shows valve flow area vs. fuel input.

Various modifications to the depicted and described system will be apparent to those skilled in the art. Accordingly, the foregoing detailed description of the preferred embodiment of the invention should be considered exemplary in nature, and not as limiting to the scope and spirit of the invention as set forth in the appended claims.

Having described the invention with sufficient clarity that those skilled in the art may practice it, I claim:

1. A method of regenerating an exhaust gas particulate trap in an exhaust gas engine system comprising the steps of:
regulating the exhaust gas flow to maintain a desired trap inlet temperature, by sensing rack position, air flow upstream of said trap, temperature at the inlet to said trap and engine speed; comparing the sensed parameters with a map of the same engine parameter for a constant engine speed; and adjusting a back pressure valve located in the exhaust gas engine system in response to the relative values of the sensed parameters and mapped engine parameters.

2. An engine system including an engine having exhaust gas conduit for discharge of exhaust gas to the atmosphere and an exhaust gas driven turbocharger including a compressor for supplying compressed air to said engine and a turbine for receiving exhaust gas from said engine, an exhaust gas particulate trap in said exhaust gas conduit downstream of said engine, and a system for regeneration of said exhaust gas particulate trap comprising:
valve means, located in the exhaust gas conduit downstream of said engine, for increasing the temperature of said exhaust gas in said particulate trap;
means for sensing selected engine operating parameters including a microprocessor, a pressure sensor upstream of said trap, an engine RPM sensor, temperature sensor at the inlet and outlet of said trap, and a rack position sensor, and
means for opening and closing said valve means in response to said parameters;
said microprocessor including an engine map of loaded trap pressure drop versus rack position and engine RPM programmed into its memory, said microprocessor receiving input from said pressure sensor, temperature sensors engine RPM and rack position sensor and comparing the sensed parameters with said map of pressure and rack position.

3. The system according to claim 2 wherein said valve means comprises a butterfly valve.

4. The system according to claim 3 wherein said valve means comprises:
a valve casing defining a passage therethrough;
a valve head; and
pivot pins on each side of said valve head, said pins extending into said casing and pivotably supporting said valve head.

5. The system according to claim 4 wherein said casing passage includes a cylindrical inlet and outlet section and a generally rectangularly shaped cross-sectional flow area within said valve.

6. The system according to claim 5 wherein said valve head is generally rectangularly shaped and sized to be pivotable within said casing to open and close said casing passage.

7. The system according to claim 6 wherein said casing includes a tapered section between the circular inlet section and the rectangularly shaped section and between the rectangular shaped section and the circular outlet section in order to provide venier flow control.

8. The system according to claim 7 wherein said valve means comprises a backpressure valve located immediately upstream of said particulate trap in said exhaust gas conduit.

9. An engine system including an engine having an exhaust gas conduit for discharge of exhaust gas to the atmosphere, an exhaust gas particulate trap in said exhaust gas conduit downstream of said engine, and a system for regeneration of said exhaust gas particulate trap comprising:
valve means, located in the exhaust gas conduit downstream of said engine, for increasing the temperature of said exhaust gas in said particulate trap;
means for sensing selected engine operating parameters; and means for opening and closing said valve means in response to said parameters, comprising a microprocessor, a pressure sensor upstream of said trap, an engine RPM sensor, temperature sensors at the inlet and outlet of said trap, and a rack position sensor, said microprocessor including an engine map of loaded trap pressure drop versus rack position and engine RPM programmed into its memory, said microprocessor receiving input from said pressure sensor, temperature sensors, engine RPM and rack position sensor, and comparing the sensed parameters with said map of pressure and rack position.

10. A system for regeneration of an exhaust gas particulate trap comprising:
an engine including an inlet air manifold, an exhaust gas manifold and exhaust gas piping;
a turbocharger including a compressor means for supplying compressed air to said engine and a turbine means, utilizing engine exhaust gas, for powering said compressor means;
an exhaust gas particulate trap located downstream of said exhaust manifold;
valve means for increasing the temperature of said exhaust gas in said particulate trap, said valve means being located in said exhaust gas piping;
actuator means for opening and closing said valve means; and
means for sensing selected engine operating parameters and controlling said actuator means in response thereto;
said means for selecting comprising a microprocessor, a pressure sensor upstream of said trap, temperature sensors upstream and downstream of said trap, an engine rack position sensor, and an engine speed sensor;
said microprocessor including an engine map of loaded trap pressure vs. rack position for a range of engine speeds programmed into its memory, said microprocessor receiving input from said pressure, temperature, engine speed, and rack position sensors and comparing the sensed parameters with said map of pressure vs. rack position for a given engine speed.

11. An exhaust gas particulate trap located downstream of said exhaust manifold;
valve means for increasing the temperature of said exhaust gas in said particulate trap, said valve means being located in said exhaust gas piping;
actuator means for opening and closing said valve means; and
means for sensing selected engine operating parameters and controlling said actuator means in response thereto;
said means for selecting comprising a microprocessor; temperature sensors upstream and downstream of said trip, an air flow measurement device, a rack position sensor, and an engine speed sensor; said microprocessor including an engine map of air flow vs. rack position for a range of engine speeds programmed into its memory, said microprocessor receiving input from said temperature, engine speed and rack position sensors, and said air flow measurement device for comparison of sensed parameters with said map of air flow vs. rack position for a given engine speed.

12. A method of controlling an engine exhaust gas particulate trap inlet temperature during regeneration comprising the steps of:
sensing exhaust gas pressure upstream of a back pressure valve located downstream of the engine, engine speed, rack position and exhaust gas temperature upstream of said trap;
comparing the sensed pressure with the pressure on an engine map of pressure vs. rack position for a range of engine speeds and inlet trap temperatures; and
restricting exhaust gas flow into said trap when said pressure is less than the map pressure and opening said back pressure valve when said pressure exceeds the corresponding map pressure.

13. The method of claim 12 further including the steps of sensing the exhaust gas temperature upstream of the trap and regulating the back pressure valve position in order to maintain a constant inlet temperature.

14. The method of claim 13 wherein said back pressure valve is opened whenever said inlet temperature exceeds the desired temperature and wherein said back pressure valve is closed whenever said inlet temperature is less than the desired temperature.

15. The method of claim 14 further including the step of sensing the exhaust gas temperature downstream of said trap and opening said back pressure valve when the outlet temperature exceeds a predetermined value.

16. A method of controlling the exhaust gas temperature into a particulate trap used in association with a turbocharger during regeneration of said trap comprising the steps of:
sensing the rack position, compressed air flow upstream of the turbocharger, temperature at the inlet to said trap and the engine speed;
calculating the air/fuel ratio;
comparing the air/fuel ratio and air flow with a map of air/fuel ratio vs. air flow for a given engine speed; and
closing a back pressure valve located in the exhaust gas flow path when said air/fuel ratio exceeds the air/fuel ratio on the engine map for a given engine speed and rack position and opening said valve when said ratio is less than the ratio on the map.

17. The method of claim 16 further including sensing the exhaust gas temperature upstream of the trap and regulating the valve position in order to maintain a constant inlet temperature.

18. The method of claim 17 wherein said valve is open whenever said inlet temperature exceeds the desired temperature and said valve is closed whenever said inlet temperature is less than the desired temperature.

19. The method of claim 18 further including the step of sensing the exhaust gas temperature downstream of said trap and opening said back pressure valve when the outlet temperature exceeds a predetermined value.

* * * * *